Dec. 10, 1929.　　R. P. DE VAULT　　1,738,762
PROJECTOR
Filed Oct. 3, 1925　　4 Sheets-Sheet 1

Inventor
Ralph P. DeVault
By Luther Johns
Atty

Dec. 10, 1929.  R. P. DE VAULT  1,738,762
PROJECTOR
Filed Oct. 3, 1925  4 Sheets-Sheet 2

Inventor
Ralph P. DeVault
By Luther Johns
Atty.

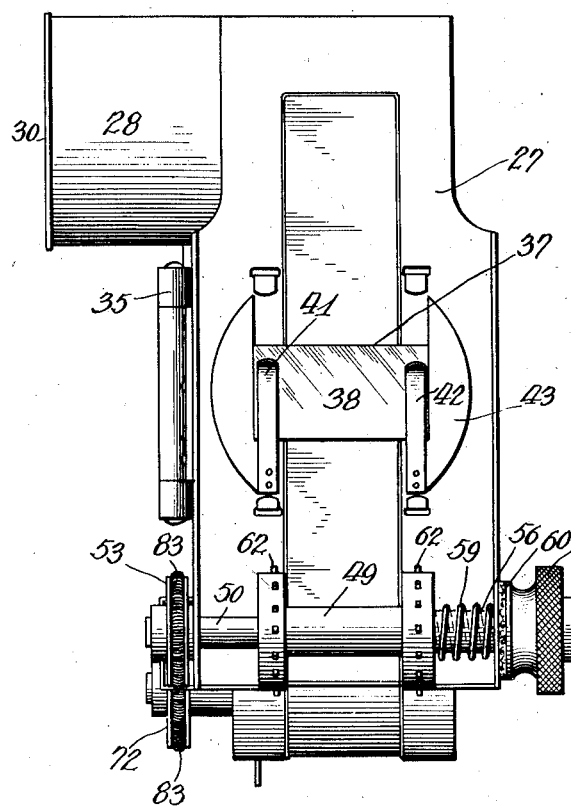
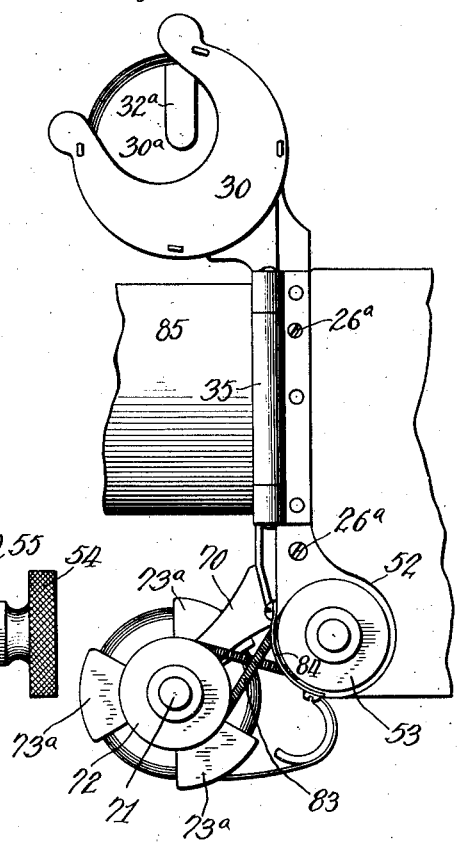

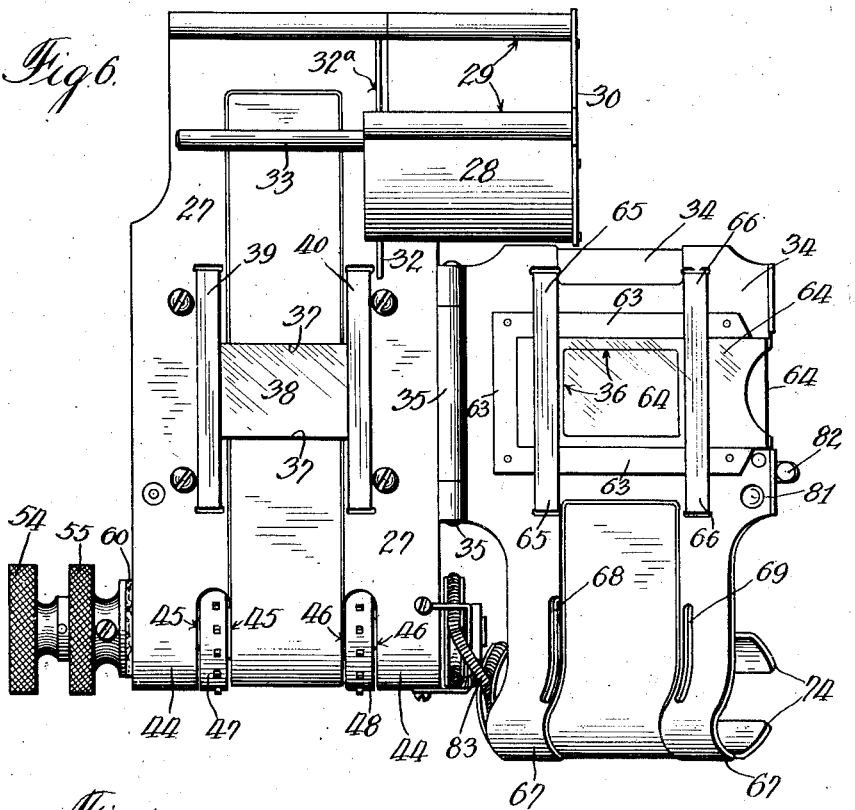

Patented Dec. 10, 1929

1,738,762

UNITED STATES PATENT OFFICE

RALPH P. DE VAULT, OF VILLA PARK, ILLINOIS, ASSIGNOR, BY MESNE ASSIGNMENTS, TO INTERNATIONAL PROJECTOR CORPORATION, OF NEW YORK, N. Y., A CORPORATION OF DELAWARE

PROJECTOR

Application filed October 3, 1925. Serial No. 60,152.

My present invention relates to projectors, and more particularly to such as are operated by hand to produce "still" pictures and which employ a film having the pictures thereon.

The main object of the invention is to provide a highly efficient and reliable projector of the character described which is peculiarly easy to thread and otherwise operate by the ordinary person, and which is simple in construction, of few parts, and which is not likely to get out of order.

A more specific object is to provide a device of this kind according to which the rewinding of the film for a subsequent projection is rendered unnecessary.

Another specific object in this connection is to provide an improved film holder according to which the roll of film to be used may be positioned and drawn off for use whether the first picture in the series is on the inside or outside of the roll.

A further feature of the invention resides in the provision of improved means for moving the film through the projector head.

A further object is in the provision of an improved framing device.

Another feature of improved results is in the fact that from time to time the movement of the film may be reversed to reexpose pictures previously shown.

A still further improvement resides in provisions overcoming the objectionable tendency of the film to stick or adhere to parts during its rest periods when a picture is being shown, and to accomplish this result also while maintaining the film substantially flat at the aperture.

Still other objects and advantages will appear hereinafter.

Figure 1:
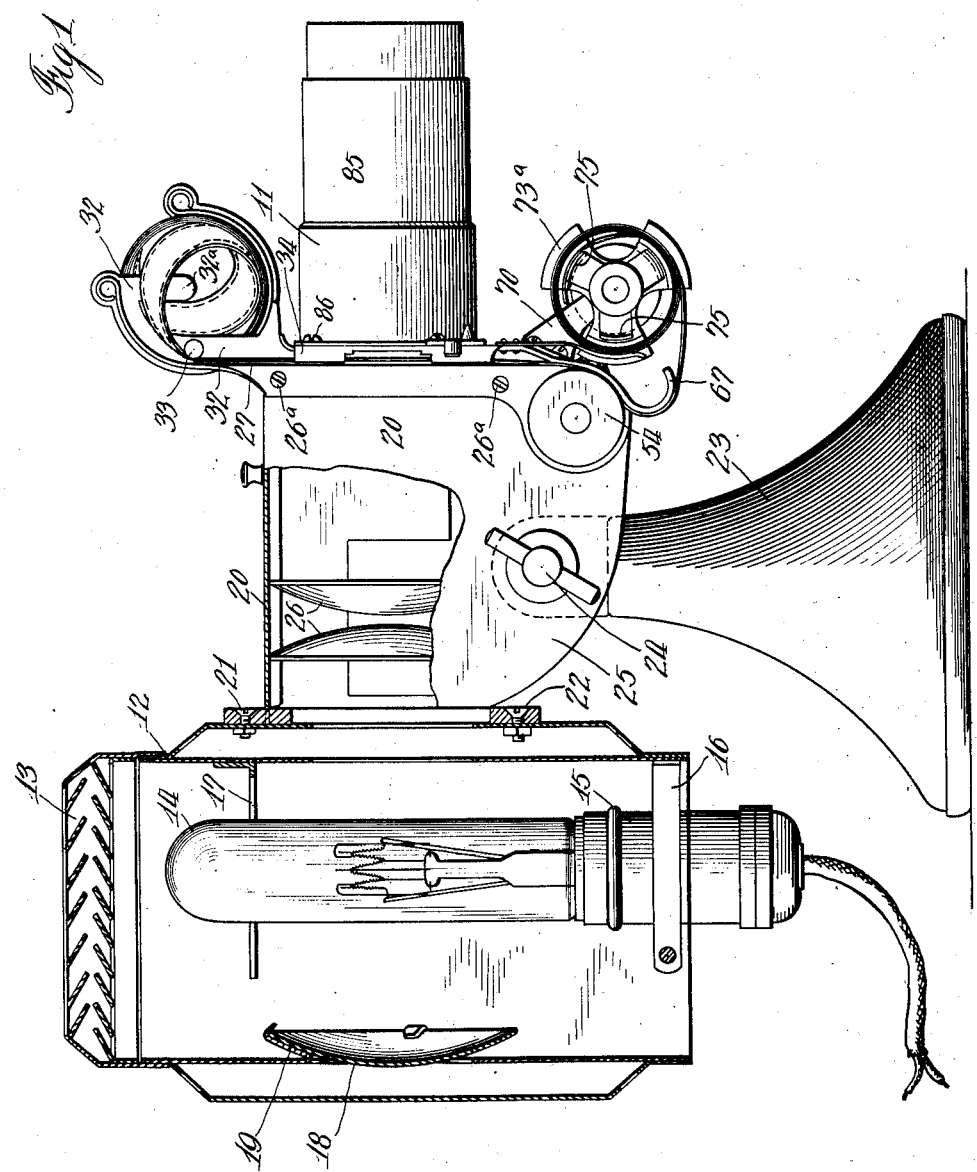
Figure 2:
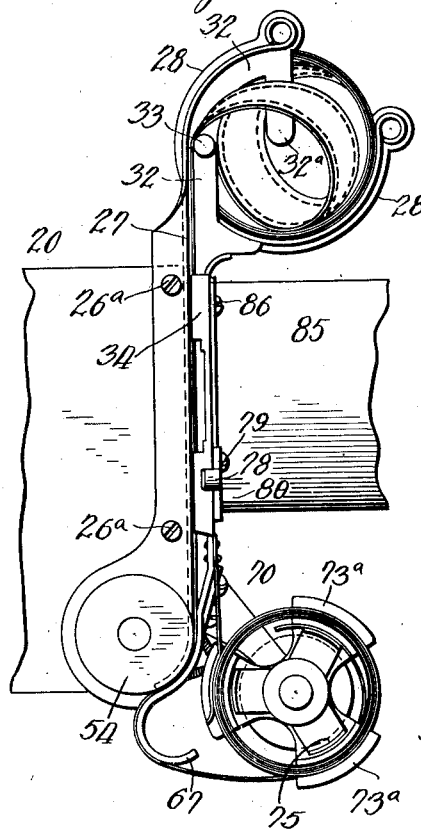
Figure 3:
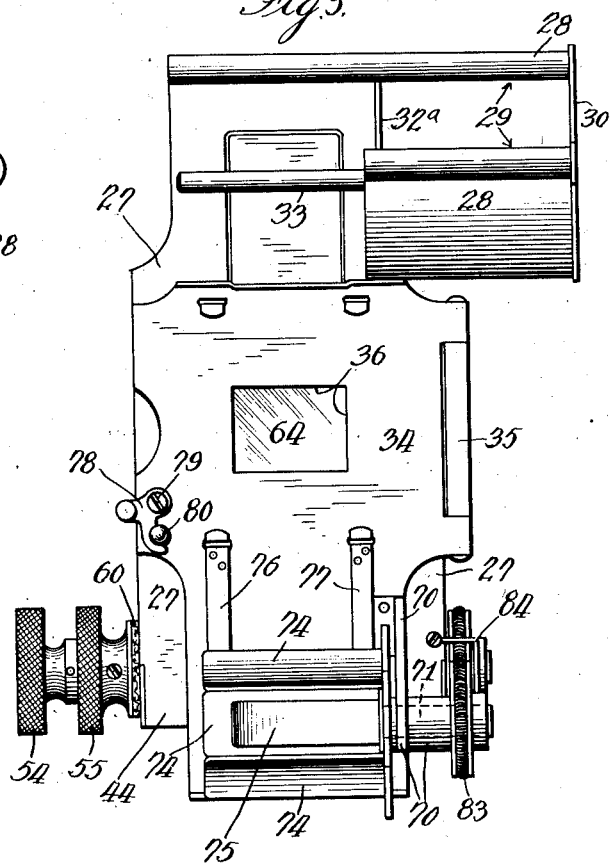

In the accompanying drawings forming a part of this specification, Figure 1 is a side view partly in section of my improved projector; Fig. 2 is a somewhat enlarged fragmentary side view of what I shall term the head mechanism showing details of the film-shifting device and the manner in which it may be attached to the body part of the projector; Fig. 3 is a front view of this head mechanism, the projection lens barrel being removed; Fig. 4 is a rear view of the head; Fig. 5 is a side elevation opposite to that shown in Fig. 2; Fig. 6 is a front elevation of the head with the gate swung open; Fig. 7 is a fragmentary view partly in section of the film-shifting device and associated parts, and Fig. 8 is a sectional view of parts shown in Fig. 7 on the line 8—8 thereof in the direction of the arrows.

The projection device as a whole illustrated comprises various old and well-known features such as the metal housing 12 provided at its upper end with a removable ventilating and light-obstructing cover 13, a lamp 14 mounted in the housing in a socket 15 attached to the housing by means of a bracket 16 and maintained in an upright position by a bracket 17 secured to the housing 12, a reflector 18 mounted at the rear of the lamp 14 and attached to the housing by means of a bracket 19, the condenser housing 20 secured to the lamp house by screws 21 and 22 and mounted for tilting upon a base 23 by a thumbscrew 24 passing through a side flange 25 of the housing 20, condensing lenses 26 mounted in the usual manner in the condenser barrel 20, and a projection barrel 11 having suitable lenses mounted on the head mechanism.

The projector device elements or parts next hereinabove referred to may have such various shapes and functional features as may be dictated by preference or by particular desired results with respect to convenience or function, and apart from the head I have thus illustrated only what is conventional and well known. The novel features of improvement disclosed herein are in various details and combinations in and comprising the head mechanism, and in a projector having such combinations and details.

Various departures in form, construction and arrangement of the head mechanism and parts thereof may also be made according to these teachings within the spirit of the invention and within the scope of the appended claims.

The head as a whole is secured to the condenser housing 20 by screws 26$^a$. The main frame of the head consists in my practice of a metal plate 27 the upper end of which is slightly curved forward to cooperate in guiding the film. A cylindrically shaped film pocket 28 is rigidly secured to the main plate 27 at the upper part and at one side thereof, and is provided with a front opening 29 from side to side and through which a small roll of film somewhat flattened may be inserted. This film pocket is provided with an end wall 30 shaped as shown in Fig. 5, and the opening 30$^a$ therein provides finger space when inserting or removing the roll. This film pocket is open at its inner end except for a film guide 32 attached to the main plate 27 serving as a narrow stop at one side of the film roll and having a depending part 32$^a$ terminating at about the axis of the pocket and serving as a stop which assists in maintaining the film roll in the pocket while permitting it to be drawn away therefrom for use.

A film guide rod 33 (being also a film-roll support in some uses) is mounted upon the film guide 32 and extends horizontally and is spaced sufficiently from the plate 27 for free movement of the film between these members.

A metal gate 34 of sheet metal, in my practice also of aluminum, is attached by a hinge 35 to the main support 27, this gate 34 containing the front glass-covered aperture 36. The main support 27 is provided with an aperture 37 normally facing the aperture 36. Within the main-plate aperture 37 is positioned loosely a piece of smooth glass 38 corresponding in shape to the rectangular aperture and maintained yieldingly by springs 41 and 42 against narrow steel strips 39 and 40 lying on the front side of the plate and positioned laterally of the aperture and normally facing the edge portions respectively of the film containing the sprocket-teeth holes. The springs 41 and 42 are mounted on a thickening metal piece 43 which is in turn attached to the main plate 27.

The steel strips 39 and 40 are preferably only about from three to four thousandths of an inch in thickness. They are conveniently secured by bending over their ends passed through holes in the plate 27. Together with the springs 41 and 42 the glass plate 38 may move resiliently forward and back. The springs 39 and 40 maintain the film in slightly spaced relation to the glass plate 38 and provide that the friction on the film shall come upon the metal strips at a lateral place where it will not deface the pictures. The springs 41 and 42 are shaped at their free ends whereby the glass 38 may readily be taken out to be cleaned.

The lower end of the main plate 27 is curved rearward as shown in Fig. 6 to form a rounded outer surface 44 slotted at 45 and 46 to provide space through which the sprocket wheels 47 and 48 respectively may project. These sprocket wheels are integral with a tubular shaft 49 mounted rigidly, as by a pin 49$^a$ (Fig. 7) upon a shaft 50 passing through rearwardly-turned flange-like extensions 51 and 52 of the main plate 27. The shaft 50 carries a pulley 53 at its left end as shown in Figs. 4 and 7, and a fingerwheel 54 at its other end. Another fingerwheel 55 is mounted on a hollow shaft 56 surrounding the shaft 50. Mounted on the shaft 56 (see Fig. 8) is a disc 57 having in its periphery four equally-spaced-apart notches 61, and a spring pawl 58 mounted upon the sprocket wheel 47 has a detent 58$^a$ adapted to engage these notches, one at a time, in the disc 57.

The rotation of the shaft 56 is against a desirable amount of friction provided by a coiled expansion spring 59 pressing against the extension 52 of the main plate 27 and against the disc 57. A friction washer 60 of cork, rubber or the like is interposed between the extension 52 of the frame and the finger piece 55 held by a set screw upon the shaft 56.

By this construction it will be seen that when the finger piece 54 is rotated the sprocket will be rotated through the pin 49$^a$ (Fig. 7) while the disc 57 and fingerwheel 55 remain stationary, the detent 58$^a$ of the pawl traveling over the disc and successively entering the notches 61 which severally constitute a stop indicating to the operator that there has been a sufficient advance of the film to bring the succeeding picture before the aperture. In the arrangement shown it is to be understood that one complete rotation of the sprocket will move four pictures past the aperture, and that turning the sprocket from one notch 61 to the next will move the film a distance equal to the common up-and-down width of the respective pictures.

When the finger wheel 55 is rotated, which is done only for framing, all of the associated parts including the disc 57 and the sprocket wheels are simultaneously turned on the common axis, and through the rotation of the sprocket by the fingerwheel 55 the film is moved until the picture is properly framed. When the picture is thus framed the notches 61 are in a relative position adapted to maintain the framing. The movement of the sprocket in framing is accomplished through the engagement of the detent 58$^a$ with one of the notches 61. Very little power is required to move the film and the sprocket is free from the friction provided for the framing device. A sufficient amount of power for framing is therefore communicated by the disc 47 through the pawl to the sprocket. When, however, the sprocket is moved through the fingerwheel 54 the friction provided for the framing device is too great to be overcome by the spring pawl connection and so the pawl slips out of these notches, traveling from one to the other, and in a very satisfactory way cooperating in stopping the film-shifting movement at the proper place.

Ordinarily, however, the operator will grasp with his finger and thumb both fingerwheels 54 and 55 when framing. They are so located as to be grasped and turned conveniently at the same time. Such operation relieves the pawl spring of all strain. In the framing operation two things are simultaneously accomplished, namely, the picture is framed and the disc 57 is reset to define the proper framing thereafter.

Referring to the aperture 36 in the gate 34, see Fig. 6, I provide about this aperture some thickening material in the shape of a rectangular strip 63 open towards the free side of the gate and a little thinner than the glass plate 64, the construction and arrangement being such that the plate may readily be inserted between the upper and lower portions of this thickening piece 63 and as readily removed. The glass is mainained in place by a pair of thin steel springs 65 and 66 held by bending and crimping their ends through openings in the gate. These springs 65 and 66, like the springs 39 and 40, are preferably only from about three thousandths to four thousandths of an inch in thickness.

When the gate 34 is closed the spring 65 overlies the spring 40 and the spring 66 overlies the spring 39, and the perforated edges of the film travel between these facing spring strips. The film is thus spaced from the glass plate 38 and also from the glass plate 64 by the thickness of these spring members, namely, several thousandths of an inch, which spacing is sufficient to prevent the film from adhering to either of the glass plates when under the heat of concentrated light rays from the lamp house it becomes somewhat soft. At the same time the spacing of the film from these plates is so slight that the tendency of the film to buckle under the heat and distort the picture is effectively prevented. By this construction I am able to obtain the advantages of means for holding the film substantially flat at the aperture while overcoming the objection of its tendency to stick when a given picture is being shown for a considerable length of time.

The lower end of the gate 34 is curved forward and back to form a guide 67 for the film. Part of this curved portion corresponds in contour to the shape of the extension 44 of the mounting 27 so that the gate closely overlies the main plate at the bottom portion thereof as well as throughout other portions. It is provided with two slots 68 and 69, (Fig. 6) permitting the teeth on the sprocket wheels 47 and 48 to pass thereinto or therethrough for clearance after engaging the perforations in the film.

A bracket 70 (Fig. 3) is mounted upon the gate 34 and supports a shaft 71. A pulley 72 is mounted upon the free outer end of this shaft and a film-winding drum or spool 73 is rigidly fastened coaxially upon its other end. This spool 73 is made up of three arc-shaped metal segments or strips 74 (Fig. 3) rigidly carried by a flat three-arm end piece 73ª (Fig. 1) projecting outward beyond the periphery of the spool members 74 to hold the film laterally at one side. A flat spring 75 (Fig. 3) is mounted upon and beneath each segment 74 of the spool and presses against it. The outer end of each of these springs is free and is bent away slightly so that the end of the film may readily be inserted between any one of them and the under surface of the segment associated therewith.

Two light strip springs 76 and 77 (Fig. 3) are mounted upon the gate 34 and guide and maintain the film against the winding spool or drum.

The pulley 53 is connected to the pulley 72 by a coiled spring belt 83 crossed over to provide the desired movement of the spool. This belt is maintained in proper position when the gate is swung open by a wire bracket 84 fastened to the curved portion 44 of the mounting 27 (Figs. 3 and 5).

The circumference of the circle defined by the metal segments 74 of the spool is larger than that of the sprocket wheels 47 and 48. The spool therefore keeps the film taut between the sprocket and the spool and winds the film tightly upon the spool. The coiled wire belt maintains the desired tension upon the pull of the spool and slips when necessary on the pulleys.

The projecting lens tube 85 is attached to the gate by screws 86, one of which is shown in Figs. 1 and 2.

The gate 34 is maintained closed during operation by a readily releasable catch 78 (Fig. 3) pivotally mounted at 79 and adapted to engage a headed pin 80 fastened to the main support 27.

For a projector of this kind a strip of film is provided which may have thereon say twenty-five to fifty pictures or more, and being of the standard size used ordinarily in motion picture work. A motion picture is not produced, however, according to this device, which is more in the nature of a stereopticon, producing still pictures.

The strip of film is first wound into a roll and, if the beginning of the series is on the inside of the roll, the roll will be flattened somewhat and pushed into the film pocket through the opening 29 and thereupon the end of the strip is drawn laterally toward the left as viewed in Fig. 6 and the free end carried around and inserted back of the rod 33, as well shown in Fig. 2, and, the gate having been opened, the end of the strip is carried downward past the aperture in the main plate and well down beyond the plate, with perforations in the film engaging the sprocket teeth, and thereupon the gate is closed and latched. The free end of the film is then inserted between one of the spring clips 75 on the under surface of the associated spool member 74, the spring pressure between these parts holding the end of the film with sufficient tension for winding the film upon the spool. The current having been turned on to illuminate the lamp and the projection barrel lens tube having been adjusted to provide the desired focus, a picture appears upon the screen, provided that the picture is in frame. Ordinarily through the various manipulations the first picture will require framing. This is done by grasping the fingerwheel 55, or preferably both fingerwheels 54 and 55, and moving the film until the proper framing is obtained and which requires usually merely a short fractional turn of the fingerwheel, and thereupon the successive pictures are thrown upon the screen by merely turning the fingerwheel 54 one-fourth of a revolution for each picture, this one-fourth revolution being indicated to the operator by the ratchet and pawl device 57—58.

When the strip of film is passed through the projecting head it is found to be tightly wound upon the spool; but not so tightly that it may not easily be slipped off. Remaining in the wound condition it may be inserted in a small container properly marked for the next operation. Assuming that all of the strips of film which it is desired to show have been thus passed through the machine, their condition as to the roll will be such that the beginning of the series of each will be at the inside. Accordingly, it is only necessary to insert such a roll as just described and proceed to show as many of the strips as may be desired. No rewinding of the film is therefore necessary, but it is always available for a second use in the condition in which it is removed from the spool, and this makes for a great saving in time during the operation and is a great convenience to the operator since, where such a strip of film must be rewound, the rewinding operation is constantly being overlooked and the operator must examine the strip to determine the proper end of the series.

It frequently happens, however, that such strips become unwound and are hastily wound up by the operator in order to put them into the little containers and get them out of the way, and it therefore happens from time to time that the pictures at the beginning of a series will be on the outer coil of the roll, and when such strips are received from the manufacturer they are invariably wound with the last picture on the inside of the coil, as that is the arrangement hitherto required for the projection of film strips in projectors of this general class.

According to these improvements the pictures may equally well be projected with the first of the series on the outside of the roll, in which case the roll is simply slipped upon the rod 33, Fig. 6, the free outer end portion drawn down behind the rod, and past the apertures and made fast to the spool and operated as already described.

Another advantageous feature of the present construction is in the fact that the film may be shifted backward as well as forward from time to time, and to any extent that may be desired, in order to show again pictures previously exposed. While there is no winding or take-up device at the upper end of the film passageway, the bulging upward of a loop of film is not objectionable to any extent that obtains with the relatively small lengths of film employed.

I claim:

1. In a film-shifting device, the combination of a shaft mounted for rotation, a sprocket on said shaft, means for rotating said shaft and sprocket to advance the film for projection, and means for rotating said shaft and sprocket for framing, said last-mentioned means comprising a ratchet element and a pawl element, one of said elements being operatively carried by said sprocket, the other of said elements being mounted for movement about the axis of the sprocket, means for rotatively moving said element which is mounted to move about the axis of the sprocket whereby when rotative movement is applied thereto the ratchet and pawl communicate such rotative movement to the sprocket.

2. In a film-shifting device, the combination of rotatably mounted means for moving the film for projection, and framing means associated therewith including a spring pawl member and a disc member having peripheral notches therein adapted to be engaged by the pawl member, one of said members being connected with the film-moving means to rotate the film-moving means, the other of said members being mounted for rotative movement on the axis of the rotatably mounted film-moving means and for movement independent of the movement of said film-moving means, with means for manually moving said last-mentioned member to communicate movement therefrom to said film-moving means through said pawl and disc members for framing.

3. In a film-shifting device, the combination of a shaft mounted for rotation and a sprocket mounted thereon to move therewith, a hollow shaft mounted on said shaft, said hollow shaft having means for rotating it manually, means for holding said hollow shaft frictionally against rotation when said first-mentioned shaft is normally rotated, and means operatively associated with both of said shafts for rotating said first-mentioned shaft when said hollow shaft is rotated.

4. In a film-shifting device, the combination of a shaft, a sprocket mounted thereon, a fingerwheel for rotating said shaft, a hollow shaft on said first-mentioned shaft, a fingerwheel on said hollow shaft adjacent to and co-axial with said first-mentioned fingerwheel whereby both of said fingerwheels may be simultaneously grasped for rotation, a disc mounted on said hollow shaft adjacent to said sprocket, said disc having notches therein at spaced-apart intervals, a spring pawl carried by said sprocket and adapted to engage said notches one after the other when said first-mentioned fingerwheel is rotated and to communicate rotative power from said hollow shaft to said sprocket when the secondly mentioned fingerwheel is rotated, and means providing resistance to the movement of said hollow shaft whereby when said first-mentioned shaft is rotated said spring pawl will move over the surface of said disc and engage said notches one after the other without moving said disc.

5. The combination of a main support having an aperture therein, a gate mounted on said main support, the gate having an aperture in line with the main-support aperture, means for holding a coil of film at the upper portion of the main support whereby the film may be fed therefrom between said support and said gate past said apertures, manually-operated rotatable film-shifting means mounted at the bottom portion of said support, a spool for winding the film mounted on the lower portion of said gate, and driving means from said film-shifting means to said spool for rotating the spool.

6. The combination of a main support having an aperture therein, a gate mounted on said main support, the gate having an aperture in line with the main-support aperture, means for holding a coil of film at the upper portion of the main support whereby the film may be fed therefrom between said support and said gate past said apertures, manually-operated film-shifting means mounted at the bottom portion of said support, a spool for winding the film mounted on the lower portion of said gate, and driving means from said film-shifting means to said spool for rotating the spool, said driving means including pulleys and a flexible belt thereon.

7. The combination of a main support having an aperture therein, a gate mounted on said support, the gate having an aperture in line with the main-support aperture, means for holding a coil of film at the upper portion of the main support whereby it may be fed between said support and said gate past said apertures, manually-operated film-shifting means mounted at the bottom portion of said main support, a spool for winding the film mounted on the lower portion of said gate, and driving means from said film-shifting means to said spool for rotating the spool, said driving means including pulleys and a flexible belt thereon adapted to slip, the relation of the spool-driving rate of movement to the rate of take-up determined by the periphery of said spool being such as to cause a slippage of the belt on the spools when the film is being wound on the spool whereby the film is tightly wound thereon.

RALPH P. DE VAULT.